United States Patent Office 3,436,129
Patented Apr. 1, 1969

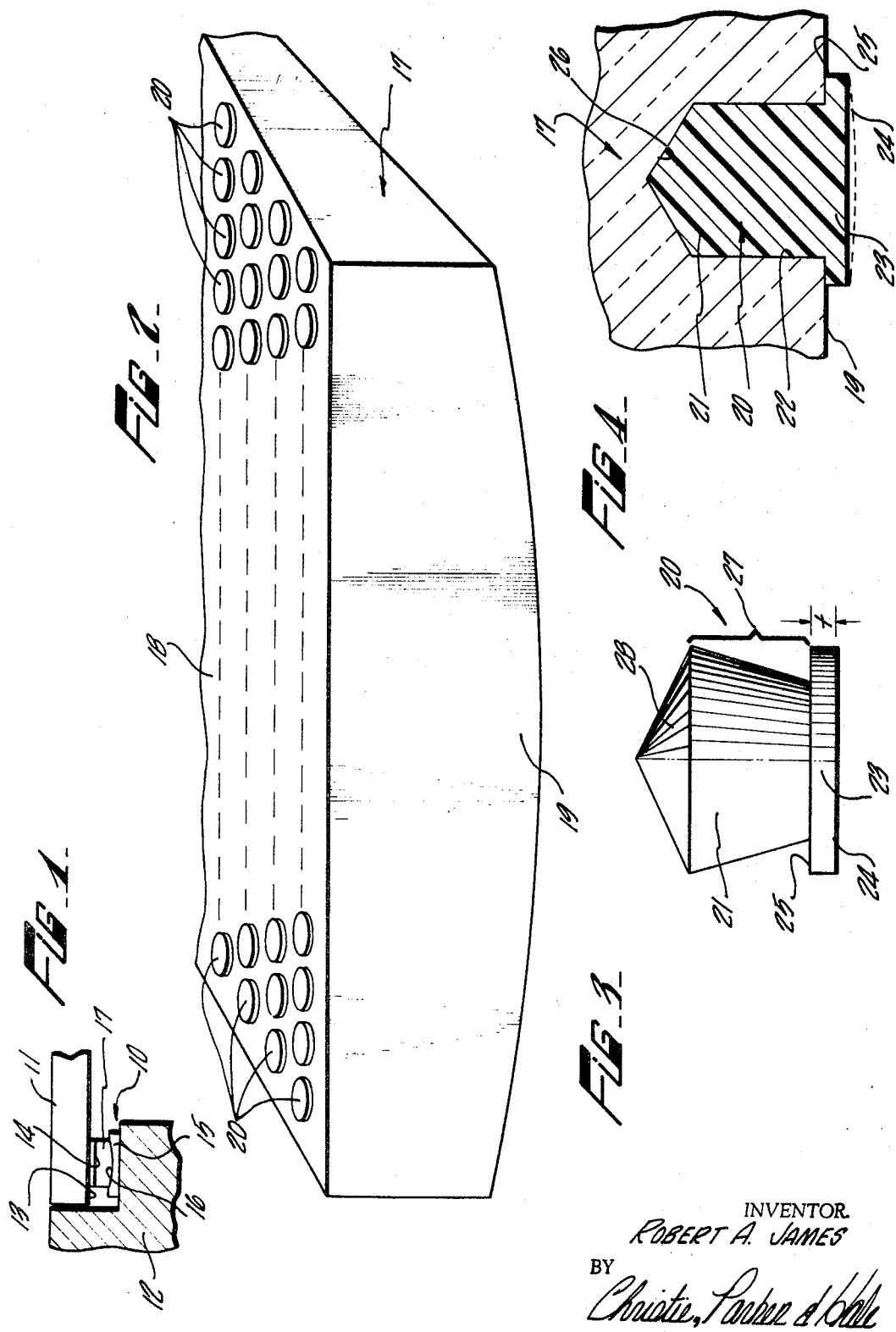

3,436,129
BEARING
Robert A. James, 3302 Bounty Circle,
Huntington Beach, Calif. 92647
Filed Jan. 9, 1967, Ser. No. 608,214
Int. Cl. F16c 33/22, 33/26; E01d 19/06
U.S. Cl. 308—3         8 Claims

ABSTRACT OF THE DISCLOSURE

A bearing suitable for use as a bridge bearing in which a plurality of tetrafluoroethylene bearing inserts are disposed in a carrier member having a bearing interface surface, each insert having a head defining a bearing end spaced from the interface surface and an elongate body which has a normal relaxed volume, prior to mounting to the carrier member, greater than a receiving cavity formed in the carrier member and into which the insert body is subsequently forced.

---

This invention relates to bearings, and particularly to a bearing having non-metallic, low-friction inserts providing a low-friction high-capacity bearing suitable for use as a bridge bearing and the like.

Bridge bearings are used in highway, railroad and other bridges for mounting the bridge spans for movement in response to imposed loads and in response to thermal expansion and contraction. Such bearings must be capable of withstanding high unit loads across their relatively movable surfaces; a unit load may be measured in terms of pounds per square inch.

Also, such bearings should accommodate thermal expansion and contraction of the supported bridge span without sticking. In other words, the static and dynamic coefficients of friction of one element of a bridge bearing should be substantially equal. To the extent that the bearing static coefficient of friction is greater than its dynamic or sliding coefficient of friction (this is the case with substantially all bearing materials), the movement of the supported span occurs in discrete increments rather than smoothly. The greater a given increment of discrete movement of a bridge span, the greater are the stresses built up and temporarily locked into the span prior to the movement. Locked in stresses in bridge spans are to be avoided.

Tetrafluoroethylene (referred to herein for the purposes of brevity as TFE) has equal coefficients of static and sliding friction, but prior bridge bearings made in part of this material have not been altogether satisfactory. Previously, bridge bearings have been provided in which one metallic element of the bearing has been coated with a TFE sheet, this sheet being engaged with an opposing surface of another element of the bearing during use of the bearing. If the TFE is unfilled (i.e., essentially pure), a load on the sheet exceeding about 1100 pounds per square inch causes the TFE to undergo cold flow. When cold flow exists, metal-to-metal contact between the two bearing elements soon results and any advantage provided by the TFE sheet is lost. If the TFE sheet is filled as with molybdenum disulfide ($MoS_2$), the load bearing capacity of the sheet to the point of cold flow is increased somewhat, but cold flow of the TFE is still a problem. As a result, in order that prior bridge bearings using TFE bearing surfaces may be used without cold flow of the TFE, such bearings have been made large so that the unit load upon the TFE during use of the bearing is well below the load levels which cause cold flow in the TFE. The large size of such bearings is undesirable and restricts their use.

This invention provides a bridge bearing which uses tetrafluoroethylene in such a manner that the TFE cannot experience cold flow until loaded to significantly higher levels than prior bearings using this material. As a result, bearings according to this invention are substantially smaller than equally rated TFE bearings previously available. The present bearing thus makes full advantage of the benefits to be derived from TFE without the disadvantages associated with prior TFE bearings.

In brief, this invention provides a bearing for supporting first and second members for relative movement along a bearing interface between the members. The bearing includes an insert carrier element adapted to be mounted to one of the members proximate to the other member. The carrier element defines an interface surface opening to the interface. At least one bearing insert is secured to the carrier element. The insert has a bearing end spaced from the interface surface of the carrier element. The insert extends from its bearing end into the carrier element and has a major portion of its volume disposed within and constrained from deformation by the carrier element. The insert is fabricated principally of tetrafluoroethylene.

The above-mentioned and other features of the invention are more fully set forth in the following detailed description of a bearing, the description being presented with reference to the accompanying drawing, wherein:

FIG. 1 is a fragmentary elevation view, partly in cross-section, of a bearing according to this invention installed as a bridge bearing;

FIG. 2 is a perspective view of a component of a bearing according to the invention;

FIG. 3 is an enlarged side elevation view of a bearing insert; and

FIG. 4 is an enlarged cross-section elevation view of a bearing insert mounted in an insert carrier element.

As shown in FIG. 1, a bridge bearing assembly 10 may be installed below an end of a bridge span 11 between the lower end of the span and an adjacent bridge foundation or footing 12. The bearing assembly includes a top plate 13 secured to the underside of the bridge span and defining a downwardly open, flat bearing interface surface 14 of a first bearing interface. The bearing assembly also includes a bottom plate 15 secured to footing 12 below the top plate and defining a concave, upwardly-open bearing interface surface 16 of a second bearing interface. Surface 16 is a portion of a circular cylinder which has its axis horizontal and aligned transversely of the length of span 11. The bearing assembly further includes a floating bearing insert carrier element 17 which, as shown in FIG. 2, defines bearing interface surfaces 18 and 19 which are complementary to and mate with surfaces 14 and 16, respectively, of the first and second bearing interfaces. The term "floating" as applied to bearing element 17 is used to indicate that this member is not secured to either the bridge span or to the bridge footing; rather, it is disposed between members 13 and 15 for movement relative to these members.

Top and bottom plates 13 and 14 and element 17 preferably are made of bronze, either common bearing bronze or a specially alloyed bearing bronze.

Pursuant to the present invention, each of surfaces 18 and 19 of element 17 carries a plurality of low-friction bearing inserts 20, each of which is made, at least in principal part, of tetrafluoroethylene. As shown in FIG. 4, each insert has a body 21 disposed wholly within a cavity 22 formed in element 17 and a bearing head 23 disposed externally of the element. The head of each insert is circular in shape and has a thickness $t$ which is small in comparison to the length of the insert. The head has a flat terminal bearing surface 24 and a parallel annular surface 25 engaged with the adjacent bearing surface when the insert is in place. The diameter of the head preferably is substantially equal to the maximum diameter of the body of the insert in its uncompressed, uninstalled state shown in FIG. 3.

Each insert receiving cavity 22 has cylindrical walls adjacent the opening of the cavity to the adjacent surface of bearing element 17. Each cavity also has a conical end 26. The cavities preferably are formed to the desired depth by a common metal drill. The body of each insert has a length from surface 25 essentially equal to the depth of the cavity, and the diameter of the body at the head of the insert is essentially equal to the diameter of the cavity. The diameter of the body of each insert, as fabricated, increases linearly from surface 25 to a point spaced from the head a distance equal to the cylindrical depth of the cavity in which the insert is to be placed. In other words, the body has a conically tapered portion 27 adjacent its head, the maximum diameter of the portion being spaced from the head. Preferably, the maximum diameter of the body is essentially equal to the diameter of the head of the insert. The remainder of the length of the body is defined by a conical end portion 28.

Each bearing insert is forced into its receiving cavity after a quantity of bonding agent has first been placed in the cavity. Preferably the bonding agent is a two-part epoxy resin system composed of bisphenol A as a basic resin and a cured amine catalyst.

From the foregoing description, it is apparent that the body of a bearing insert has a volume a selected amount greater than the volume of its receiving cavity. As a result, the body of the installed insert is compressed with element 17 and, by virtue of this compression, is constrained by the element from further deformation during use of the element in bearing assembly 10. Also, this compression of the insert is greatest adjacent the base of the receiving cavity, and thus the compression of the insert serves to retain the insert in its cavity. Further, the compression of the body in its receiving cavity causes bearing surface 24 to bow outwardly slightly, as shown by dashed lines in FIG. 4 during no-load conditions in the bearing assembly.

The bearing inserts are closely spaced from each other over surfaces 18 and 19 of element 17. The inserts, however, are spaced sufficiently from each other that the material of carrier element 17 is essentially rigid between adjacent cavities during use of the bearing assembly. In other words, there is sufficient of the material of element 17 between adjacent cavities 22 that the walls of any cavity cannot deform to permit expansion of a compressed body of the insert in that cavity during use of the bearing assembly. Because the compressed bodies of the inserts cannot expand during use of the assembly, the load-bearing capacity of the inserts is maintained at a high level over the life of the assembly.

Sufficient inserts are provided in each of surfaces 18 and 19 that when the total load to be carried by the bearing assembly is divided by the total area of insert surfaces 24 exposed adjacent either of surfaces 18 or 19, the resultant figure is the desired rated in-use pressure to be borne by the inserts.

In use, by virtue of the above-described construction of element 17 including inserts 20, the bearing assembly has substantially equal static and dynamic coefficients of friction. As bridge span 11 expands and contracts in response to temperature changes, movement of top plate 13 relative to element 17 occurs along the first interface of the bearing assembly. This relative motion is essentially linear and occurs smoothly in view of the fact that the static or starting coefficient of tetrafluoroethylene relative to another material or to itself is substantially equal to its dynamic or sliding coefficient of friction. As a result, thermal stresses are not built up in the span.

As the span is subjected to varying beam loads, it tends to deflect. This deflection is accommodated smoothly by angular motion of element 17 relative to bottom plate 15 along the second interface of the bearing assembly.

It was mentioned above that prior bridge bearings and the like providing a tetrafluoroethylene bearing surface used sheets of TFE bonded or otherwise secured to a component of the bearing assembly, and that such prior bearing had limited load-carrying capacity (in terms of pounds per square inch of movable bearing surface) because of the tendency of sheet TFE to cold-flow under high loads. The above-described bearing is not subject to these disadvantages. Because the TFE is provided in a number of inserts, each of which has the major portion of its volume compressed within a rigid carrier, the pressure levels which can be sustained by insert surfaces 24 before the insert material flows is substantially and significantly higher than in previous bridge bearings. Before the head of a given insert can begin to cold-flow under load, the total force applied to the head must be considerably more than that required to deform surface 24 from a convex to a flat state. When the bearing is in use under rated loading conditions, head surfaces 24 are essentially flat or parallel to the adjacent interface surface of carrier element 17, as the case may be. In effect, each insert 20 is prestressed so that its load-bearing capacity is greatly increased over the load-bearing capacity of unstressed insert. Because the insert material has nowhere to go relative to the carrier element, the insert resists cold flow.

In a presently preferred embodiment of the invention in which the minimum thickness of element 17 between surfaces 18 and 19 is one-half inch, the inserts are mounted in holes ⅜ inch in diameter and spaced apart on one-inch centers. In these inserts, dimension $t$ is .010 inch, and portions 27 are $\frac{3}{16}$-inch long. The diameter of the body increases about $\frac{1}{64}$ inch over the length of portion 27.

If inserts 20 are made to small, an inordinate number of inserts must be used to provide a bearing having a given unit rating, and the size of element 17 will be larger than necessary. If the inserts are made too large, the prestress condition of the inserts will be lowered with a resulting decrease in the load bearing capacity of the inserts.

Inserts 20 may be made of TFE free of any fillers. Preferably, however, the inserts are made of TFE containing 15% by volume of molybdenum disulfide; alternatively, glass fiber may be used as a filler. Such filled TFE has greater load bearing capacity than unfilled TFE. Unfilled TFE sheet flows when subjected to a load of 1100 p.s.i. $MoS_2$-filled TFE in sheet form can withstand 1500 p.s.i., while TFE sheet filled with glass fiber can support 1850 p.s.i. In the present invention, $MoS_2$-filled inserts can sustain a load of 15,000 p.s.i.

A bearing according to the present invention is particularly suited for use where electrolytic corrosion can occur. In all-metal bearings, electrolysis results in etching of the surfaces defining a bearing interface, and etching markedly increases the coefficient of friction of a bearing element. The inserts used in the present invention are non-metallic and cannot be electrolytically etched. As a result, the present invention provides a most useful bridge bearing. Also, a bearing in accord with the invention provides an excellent bearing for use in salt water environments, such as in bearings for ship propellor shafts. By securely containing the above-described bearing inserts in the matrix defined by the insert carrier element, the inserts can withstand virtually the same load as the matrix.

The present invention has been described above in the context of a bridge bearing merely for the purposes of example and illustration. It will be appreciated that the invention can be used to advantage in other types of bearings with attendant alterations, within the scope of the invention, of the structure described. Accordingly, the foregoing description is not to be regarded as limiting the present invention.

What is claimed is:

1. A bearing comprising a bearing insert carrier element having a bearing interface surface, and at least one bearing insert secured to the carrier element and extending from a bearing end thereof spaced from the interface surface into the carrier element, the insert being fabricated principally of tetrafluoroethylene, the carrier element defining for each insert a receiving cavity normal to and open to the interface surface, each cavity having a circularly cylindrical portion of selected length adjacent the interface surface, each insert having a shank disposed in a receiving cavity and terminating in an enlarged diameter head which defines the insert bearing end, the shank of each insert having a portion of said selected length extending from the insert head away from the insert bearing end, the shank at the intersection thereof with the head having a diameter essentially equal to the diameter of the cavity cylindrical portion, the insert shank increasing substantially linearly in diameter from the head to the end of said selected length portion remote from the head so that the shank, prior to insertion into its cavity, has a volume greater than the volume of the cylindrical portion of the cavity and so that the shank, as disposed in the cavity, is compressively deformed to conform to the contour of the cavity.

2. A bridge bearing comprising a bronze abutment bearing plate having a bearing surface, a bronze span bearing plate having a bearing surface, the bearing surface of one of the bearing plates being planar and the bearing surface of the other plate being circularly cylindrically concave, a metal bearing insert carrier member having opposite bearing interface surfaces one of which is planar and the other of which is circularly cylindrically convex for cooperation with the concave bearing plate surface, and a plurality of bearing inserts mounted to the carrier member on each interface surface thereof, each bearing insert extending from a bearing end thereof through the interface surface into the carrier member, the inserts being fabricated principally of tetrafluoroethylene, the carrier member defining for each insert a receiving cavity normal to and open to the interface surface, each cavity having a circularly cylindrical portion of selected length adjacent the interface surface, each insert having a shank disposed in a receiving cavity and terminating in an enlarged diameter head which defines the insert bearing end, the shank of each insert having a portion of said selected length extending from the insert head away from the insert bearing end, the shank at the intersection thereof with the head having a diameter essentially equal to the diameter of the cavity cylindrical portion, each insert shank increasing substantially linearly in diameter from the head to the end of said selected length portion remote from the head so that the shank, prior to insertion into its cavity, has a volume greater than the volume of the cavity cylindrical portion and so that the shank, as disposed in the cavity, is compressively deformed to conform to the contour of the cavity.

3. A bearing according to claim 1 wherein the head of each insert has a thickness in the direction of the elongate extent of the body thereof substantially less than the elongate extent of said body.

4. A bearing according to claim 1 wherein the bearing surface of each insert is convex away from said carrier element interface surface under no-load conditions of the bearing and is substantially parallel to said interface surface thereadjacent during rated-load conditions of the bearing.

5. A bearing according to claim 1 wherein said interface surface of the carrier element is essentially planar.

6. A bearing according to claim 1 wherein said interface surface of the carrier element defines a portion of a circular cylinder.

7. A bearing according to claim 1 wherein the carrier element defines first and second bearing interface surfaces on opposite sides thereof, each interface surface having a plurality of inserts extending therethrough, the first interface surface being essentially planar and the second interface surface defining a portion of a circular cylinder having its axis parallel to the first interface surface.

8. A bearing according to claim 1 wherein the bearing inserts include a minor portion of finely divided molybdenum disulfide particles substantially uniformly distributed throughout said tetrafluoroethylene.

References Cited

UNITED STATES PATENTS

| | | | |
|---|---|---|---|
| 2,680,259 | 6/1954 | Milk | 308—3 |
| 2,739,195 | 3/1956 | Bales | 308—238 X |
| 2,910,879 | 11/1959 | Hanks. | |
| 2,916,226 | 12/1959 | McGraw. | |
| 3,020,604 | 2/1962 | Bransford | 308—3 |
| 3,058,791 | 10/1962 | Stallman | 308—238 |
| 3,151,015 | 9/1964 | Griffith. | |
| 3,177,540 | 4/1965 | Hall | 85—5 |
| 3,218,680 | 11/1965 | Deal | 85—5 |
| 3,233,502 | 2/1966 | Fernberg | 85—80 |
| 3,325,135 | 6/1967 | Clarke | 85—5 X |

FOREIGN PATENTS 641,939   5/1962   Canada.

MARTIN P. SCHWADRON, *Primary Examiner.*

L. L. JOHNSON, *Assistant Examiner.*

U.S. Cl. X.R.

14—16; 308—238, 239